United States Patent
Luginsland et al.

(10) Patent No.: US 6,472,481 B1
(45) Date of Patent: Oct. 29, 2002

(54) SULFUR-FUNCTIONAL POLYORGANOSILOXANES

(75) Inventors: Hans-Detlef Luginsland, Köln; Roland Krafczyk, Hildesheim; Wolfgang Lortz, Wächtersbach, all of (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/427,100

(22) Filed: Oct. 26, 1999

(30) Foreign Application Priority Data

Oct. 27, 1998 (DE) .......................... 198 49 404
Feb. 12, 1999 (DE) .......................... 199 05 820

(51) Int. Cl.$^7$ ............................................ C08G 77/392
(52) U.S. Cl. ........................................ 525/474; 525/479
(58) Field of Search .................... 525/474, 479

(56) References Cited

U.S. PATENT DOCUMENTS

| | | | |
|---|---|---|---|
| 3,350,345 A | 10/1967 | Vanderbilt et al. | |
| 3,978,103 A | 8/1976 | Meyer-Simon et al. | |
| 4,048,206 A | 9/1977 | Voronkov et al. | |
| 4,113,696 A | 9/1978 | Williams et al. | |

FOREIGN PATENT DOCUMENTS

| | | | |
|---|---|---|---|
| DE | 2 141 159 | | 3/1973 |
| DE | 2 212 239 | | 10/1973 |
| DE | 2 255 577 | | 6/1974 |
| EP | 0 784 072 | A1 | 7/1997 |
| FR | 2 094 859 | | 2/1972 |
| JP | 10176081 | * | 6/1998 |
| WO | WO 99/02602 | | 1/1990 |

OTHER PUBLICATIONS

Copy of European Search Report for counterpart application no. EP 99 12 1344, dated Jan. 2, 2001.

* cited by examiner

*Primary Examiner*—Christopher Henderson
(74) *Attorney, Agent, or Firm*—Smith, Gambrell & Russell, LLP

(57) ABSTRACT

Sulfur-functional polyorganosiloxanes corresponding to the general formula I with substituents as described in the specification, corresponding to the general formula I

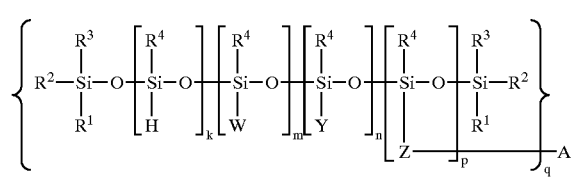

They can be used in rubber mixtures.

4 Claims, No Drawings

SULFUR-FUNCTIONAL POLYORGANOSILOXANES

INTRODUCTION AND BACKGROUND

The invention relates to new sulfur-functional polyorganosiloxanes, a process for their preparation and their use in rubber mixtures and for the production of mouldings.

The use of sulfur-containing organosilicon compounds such as 3-mercaptopropyltriethoxysilane or bis(3-[triethoxysilyl]propyl)tetrasulfane as silane coupling agents or reinforcing additives in rubber mixtures containing oxide filler for use as treads and other parts of automobile tires is known (DE 2 141 159, DE 2 212 239, U.S. Pat. No. 3,978,103, U.S. Pat. No. 4,048,206).

Furthermore, it is known that sulfur-containing silane coupling agents can be used in the production of sealing compounds, moulds for metal casting, paint coatings and protective coatings, adhesives, asphalt mixtures and for plastics containing oxide filler.

These coupling or bonding agents form bonds both with the filler and with the elastomer and consequently bring about a good interaction between the filler surface and the elastomer. They lower the mixing viscosity and facilitate the dispersion of the filler.

EP 0 784 072 A1 describes the use of a combination of a silane coupling agent and a functionalized polyorganosiloxane having at least one functional siloxyl group which can bond to the silica.

As a coupling agent in rubber mixtures, 3-mercaptopropyltriethoxysilane is able to produce an improved silica/elastomer coupling at a comparatively low dosage (U.S. Pat. No. 3,350,345, FR-A-2 094 859). However, owing to the high reactivity of the SH group and consequently the well-known tendency to form preliminary cross-linking as well as increased mixing viscosity, the workability of the mixtures and their industrial application are limited. It is also known that the addition of a protective additive consisting of a functional polyorganosiloxane having at least one functional siloxyl group decreases the reactivity, lowers the mixing viscosity and thus ensures that such rubber mixtures are workable (EP 0 784 072 A1). From the economic aspect it is to be regarded as disadvantageous that, in addition to the silane coupling agents described in EP 0 784 072 A1, a siloxyl-functionalized polyorganosiloxane also has to be added to the rubber mixture.

Furthermore, it is known that the use of commercially available silane coupling agents (DE 22 55 577) having three alkoxy substituents on the silicon atom leads to the release of considerable quantities of alcohol during the mixing process.

It is therefore an object of the present invention to avoid problems of the prior art.

SUMMARY OF THE INVENTION

The above and other objects of the invention can be achieved by sulfur-functional polyorganosiloxanes corresponding to the general formula I corresponding to the general formula I

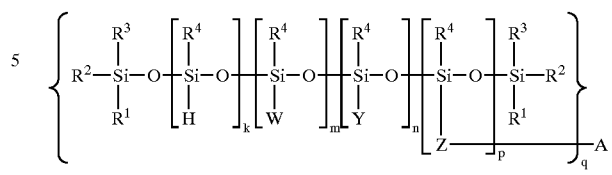

wherein $R^1$, $R^2$, $R^3$, $R^4$, independently of one another, denote

H, $(C_1-C_4)$alkyl, $(C_1-C_4)$alkoxy, $(C_1-C_4)$haloalkoxy, $(C_1-C_4)$haloalkyl, phenyl, aryl or aralkyl and W denotes a group which can bond to the silica and preferably can be $(C_1-C_4)$alkoxy or $(C_1-C_4)$ haloalkoxy and Y denotes alkyl, haloalkyl, phenyl, aryl or aralkyl and Z denotes an alkylidene group having 0–6 carbon atoms and A denotes a group which can bond with at least one elastomer of the rubber mixture:

for q=1 preferably a mercapto group (SH) and thiocyanate group (SCN) and for q=2 a disulfide ($S_2$) and a polysulfide ($S_x$) with x=2–10 and H denotes hydrogen and the sum of $k+m+n+p \geq 3$ and also k and n can equal 0.

Preferred polyorganosiloxanes in connection with the invention which may be mentioned first of all are the following, built up from linear statistical, sequential or block polymers, in which $R^1$, $R^2$, $R^3$ and $R^4$=alkyl, in particular methyl, W=alkoxy, in particular ethoxy, Y=alkyl, in particular n-propyl, Z=alkylidene, in particular $CH_2CH_2CH_2$, m and p=1–100, and k and n=0–50, with the sum of $k+m+n+p=10$–150, in particular 20–100.

In a preferred embodiment, $R^1$, $R^2$, $R^3$, $R^4$ can be methyl, W=ethoxy, Y=n-propyl, Z=$CH_2CH_2CH_2$, A=mercapto (SH), thiocyanate (SCN) for q=1 and A=polysulfide ($S_x$) and disulfide ($S_2$) for q=2 and $k+m+n+p=10$–150, in particular 20–100.

The polyorganosiloxanes according to the invention wherein A=$S_x$ can be cyclic, branched or linear in form.

DETAILED DESCRIPTION OF INVENTION

The compounds according to the invention can exist both as an individual compound having a defined molecular weight, and as a mixture of oligomers having a molecular weight distribution.

The compounds according to the invention corresponding to the general formula I can be easily prepared in two steps, by reacting compounds corresponding to the general formula II

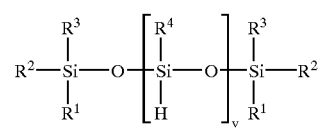

wherein $R^1$, $R^2$, $R^3$ and $R^4$ have the meanings given above and v can be a number between 2 and 150, with compounds corresponding to the general formula III

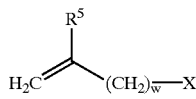

III wherein $R^5$ H, alkyl and X are fluorine, chlorine, bromine and iodine, preferably chlorine, and w is a number between 0 and 15, preferably w=1 and $R^5$=H (allyl chloride) and also $R^5$=methyl (methallyl chloride), under catalytic conditions by a mechanism of hydrosilylation using a catalyst from the family of the platinum metals, optionally in a solvent, and optionally at reaction temperatures between 20° C. and 200° C., at pressures between normal pressure or an excess pressure up to 6 bar, to form compounds corresponding to the general formula IV

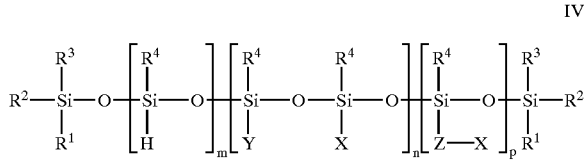

IV wherein $R^1$, $R^2$, $R^3$, $R^4{}_1$, X, Y, Z, m, n and p have the meanings given above.

In the second step, compounds corresponding to the general formula IV can be reacted with MSH, MSCN or $M_2S_x$, wherein M is a metal ion and x, on statistical average, can be a number between 2 and 10, or with $M_2S$ and S, wherein M is a metal ion, in an alcohol W—H, wherein W has the meaning given above, optionally at reaction temperatures between 20° C. and 150° C. and optionally under catalytic conditions, at normal pressure, to form the compounds according to the invention corresponding to the general formula I.

The compound corresponding to formula IV can advantageously be prepared as follows:—A subequivalent quantity of a mixture consisting of a compound corresponding to formula III, wherein X, $R^5$ and w have the meanings given above, and a platinum catalyst, preferably of the Karstedt type, are added without solvents, at normal pressure or excess pressure up to 6 bar, preferably at normal pressure, at temperatures between 20° C. and 200° C., particularly preferable 100° C. to 150° C., to a compound corresponding to formula II. The mixture is stirred for 1 h to 8 d, preferably 1 to 24 h, at normal pressure or excess pressure up to 6 bar, preferably at normal pressure, at temperatures between 20° C. and 200° C., particularly preferably 100° C. to 120° C., then the reaction is concluded and the new compounds of type IV remain behind, mostly in the form of viscous liquids. The reactions can advantageously be carried out under absolute conditions, that is, with the exclusion of moisture.

Various hydrosilylation processes of the type described above are known from U.S. Pat. No. 3,159,601, EP-A-57 459, U.S. Pat. No. 3,419,593, U.S. Pat. No. 3,715,334, U.S. Pat. No. 3,775,452 (Karstedt).

Owing to the differing selectivities of the catalysts, there can be a resulting formation of the fragment corresponding to formula V

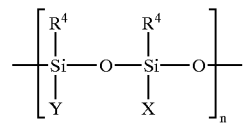

V wherein $R^4$, X, Y and n have the meanings given above.

At a selectivity of 100%, n=0 in compound IV and in fragment V respectively.

In a second step, the compound according to the invention corresponding to formula I can advantageously be prepared as follows:—A compound corresponding to formula IV, wherein $R^1$, $R^2$, $R^3$, $R^4$, W, X, Y, Z, m, n and p have the meanings given above is added to a suspension of MSH, MSCN or $M_2S$ and S, or to previously prepared $M_2S_x$, in an alcohol W—H. Hydrogen gas is formed in this process. The reaction is heated for 1 h to 8 d, preferably 1 to 24 h, at normal pressure, to temperatures between 20° C. and 150° C., particularly preferably at the boiling point of the alcohol W—H and, on conclusion of the reaction, the precipitate formed is filtered off. After the removal of the excess alcohol W—H, the new compounds of type I generally remain behind in the form of viscous liquids or low-melting solids.

The alcoholysis and sulfur-functionalization take place simultaneously in the process according to the invention. No additional catalyst is required for the alcoholysis. In the case of complete alcoholysis, k=0 in compound I. In addition, the Si-X group in fragment V is simultaneously converted to Si-W.

Ammonium ions, sodium ions or potassium ions can be used as the preferred metal ions. In this connection, the use of the corresponding sodium compound is particularly preferred.

Various sulfidation processes of the type described above are known and are described in JP 722 8588, U.S. Pat. No. 5,405,985 and U.S. Pat. No. 5,466,848.

The term "alkyl" means both "straight-chain" and "branched" alkyl groups. The term "straight-chain alkyl group" means, for example, groups such as methyl, ethyl, n-propyl, n-butyl, n-pentyl, n-hexyl; "branched alkyl group" means groups such as, for example, isopropyl or tert. butyl. The term halogen means fluorine, chlorine, bromine or iodine. The term "alkoxy" denotes groups such as, for example, methoxy, ethoxy, propoxy, butoxy, isopropoxy, isobutoxy or pentoxy.

Within the scope of the invention, "aryl" means phenyls, biphenyls, phenols or other benzenoid compounds substituted with $(C_1-C_6)$alkyl-, $(C_1-C_6)$alkoxy-, halogen, or with hetero atoms such as N, O, P or S. "Arylalkyl" means that the "aryls" indicated above are bonded to the relevant silicon atom by a $(C_1-C_6)$ alkyl chain, which for its part can be $(C_1-C_4)$alkyl- or halogen-substituted. If "aryl" contains a hetero atom such as O or S, the $(C_1-C_6)$ alkyl chain can also form a bond with the silicon atom via the hetero atom.

Where substituents such as, for example, $(C_1-C_4)$ alkoxy are named, the number shown as a subscript indicates the total number of carbon atoms in the group.

The advantage of the multifunctional polyorganosiloxanes according to the invention is a use as silane coupling agents in silica-reinforced rubber mixtures, wherein they have at least one functional siloxyl group, which is able to form a chemical and/or physical bond with the hydroxyl groups at the surface of the silica particles, and contain at least one sulfur functionality, which is capable of chemical bonding to the polymer chains. As a result of the smaller proportion of alkoxy functions compared with prior art, the use of the multifunctional polyorganosiloxanes according to the invention also leads to a diminished release of alcohol during the mixing process.

The sulfur-functional polyorganosiloxanes according to the invention are particularly suitable for use in rubber mixtures.

After the application of the process according to the invention, rubber mixtures which contain the sulfur-functionalized polyorganosiloxanes according to the invention as coupling agents or reinforcing additives and mouldings—in particular pneumatic tires or tire treads—resulting from a vulcanization step exhibit a low rolling resistance with at the same time a good wet adhesion and high abrasion resistance.

The present invention also provides rubber mixtures which contain the sulfur-functional polyorganosiloxanes according to the invention. The rubber mixtures can also contain rubber, fillers, in particular also precipitated silica and optionally other rubber auxiliaries, and at least one sulfur-functional polyorganosiloxane according to the invention, in quantities of 0.1 to 15 wt. %, particularly preferably 5–10 wt. %, based on the quantity of the oxide filler used.

Where the sulfur-functional polyorganosiloxanes according to the invention are used in rubber mixtures, there are found to be advantages over the known mixtures as regards the static and dynamic vulcanization data.

The sulfur-functional polyorganosiloxanes according to the invention and the fillers are preferably added at composition temperatures of 80 to 200° C. But they can also be added laterat lower temperatures (40 to 100° C.) for example, together with other rubber auxiliaries.

The sulfur-functional polyorganosiloxanes according to the invention can be introduced into the mixing process either in pure form or applied to an inert organic or inorganic support. Preferred supporting materials are silicas, natural or synthetic silicates, aluminum oxide or carbon blacks.

Suitable fillers for the rubber mixtures according to the invention are:

Carbon blacks: The carbon blacks to be used here are produced by the lampblack, furnace or channel black process and have BET surface areas of 20 to 200 $m^2/g$. The carbon blacks may optionally also contain hetero atoms such as, for example, Si.

Highly dispersed silicas, prepared, for example, by precipitation from solutions of silicates or flame hydrolysis of silicon halides, having specific surfaces of 5 to 1000, preferably 20 to 400 $m^2/g$ (BET surface area) and primary particle sizes of 10 to 400 nm. The silicas may optionally also be present as mixed oxides with other metal oxides, such as the oxides of Al, Mg, Ca, Ba, Zn and titanium.

Synthetic silicates, such as aluminum silicate; alkaline-earth silicates, such as magnesium silicate or calcium silicate, having BET surface areas of 20 to 400 $m^2/g$ and primary particle diameters of 10 to 400 nm.

Natural silicates, such as kaolin and other naturally occurring silicas.

Glass fibres and glass fibre products (mats, strands) or glass microbeads.

It is preferable to use carbon blacks having BET surface areas of 20 to 400 $m^2/g$ or highly dispersed silicas, prepared by precipitation from solutions of silicates, having. BET surface areas of 20 to 400 $m^2/g$ in quantities of 5 to 150 parts by weight, in each case based on 100 parts rubber.

The above-mentioned fillers can be used alone or in a mixture. In a particularly preferred embodiment of the process, 10 to 150 parts by weight of light-coloured fillers, optionally together with 0 to 100 parts by weight carbon black, and 0.1 to 15 parts by weight, preferably 5 to 10 parts by weight, of a compound corresponding to formula I, in each case based on 100 parts by weight of the filler used, may bemused for the preparation of the mixtures.

Besides natural rubber, synthetic rubbers are also suitable for preparing the rubber mixtures according to the invention. Preferred synthetic rubbers are described, for example, in: W. Hofmann, Kautschuktechnologie, Genter Verlag, Stuttgart 1980. They include:

Polybutadiene (BR)

Polyisoprene (IR)

Styrene/butadiene copolymers having styrene contents of 1 to 60 wt. %, preferably 2 to 50 wt. % (SBR)

Isobutylene/isoprene copolymers (IIR)

Butadiene/acrylonitrile copolymers having acrylonitrile contents of 5 to 60, preferably 10 to 50 wt. % (NBR)

partially hydrogenated or completely hydrogenated NBR rubber (HNBR)

Ethylene/propylene/diene copolymers (EPDM)

and mixtures of these rubbers. In particular, anionically polymerised L-SBR rubbers having a glass temperature of above −50° C. as well as mixtures of these with diene rubbers are of interest for the production of tires for automobiles.

The rubber vulcanizates according to the invention can also contain other rubber auxiliaries, such as reaction accelerators, antioxidants, heat stabilizers, light stabilizers, antiozonants, processing aids, plasticizers, tackifiers, blowing agents, dyes, waxes, extenders, organic acids, retarders, metal oxides and activators, such as triethanolamine, polyethylene glycol, hexanetriol, which are known in the rubber industry.

The rubber auxiliaries are used in conventional quantities, which depend inter alia on the intended use. Conventional quantities are, for example, quantities of 0.1 to 50 wt. %, based on rubber. The sulfur-functionalized polyorganosiloxanes can be used on their own as cross-linking agents. As a rule, the addition of other cross-linking agents is recommended. Other known cross-linking agents which can be used are sulfur or peroxides. The rubber mixtures according to the invention can in addition contain vulcanization accelerators. Examples of suitable vulcanization accelerators are mercaptobenzothiazoles, sulfenamides, guanidines, thiurams, dithiocarbamates, thioureas and thiocarbonates. The vulcanization accelerators and sulfur or peroxides are used in quantities of 0.1 to 10 wt. %, preferably 0.1 to 5 wt. %, based on rubber.

The vulcanization of the rubber mixtures according to the invention can take place at temperatures of 100 to 200° C., preferably 130 to 180° C., optionally under pressures of 10 to 200 bar. The mixing of the rubbers with the filler, optionally with the rubber auxiliaries and with the sulfur-functionalized polyorganosiloxanes according to the inventioncan be carried out in conventional mixing units, such as rolls, closed mixers and mixer-extruders. The rubber vulcanizates according to the invention are suitable for the production of mouldings, for example, for the production of pneumatic tires, tire treads, cable sheaths, hoses, drive belts, conveyor belts, roller coatings, tires, shoe soles, sealing rings and damping elements.

EXAMPLES 1 to 3

Preparation of the Sulfur-functionalized Polyorganosiloxanes in Two Steps

Example 1

First step: A mixture consisting of 59.6 g (779.0 mmol) allyl chloride (commercial product of the firm Aldrich) and 1 ml of a 1% platinum solution in toluene (Karstedt catalyst) is added dropwise over a period of 2 h at 100° C. to 100.0 g (38.9 mmol) silicone oil (Baysilone oil MH 15, commercial product of Bayer AG) corresponding to formula II with $R^1=R^2=R^3=R^4$=methyl, v=40. In the course of this, the temperature rises to 140° C. On conclusion of the addition, the mixture is stirred for 30 min at 100° C. After the mixture has been cooled, 156.3 g (98% of the theoretical value) of the compound corresponding to formula IV, with $R^1=R^2=R^3=R^4$=methyl, X=Cl, Y=$CH_2$—$CH_2$—$CH_3$, Z=$CH_2$—$CH_2$—$CH_2$, m=10, n=10, p=10 is obtained as a light yellow liquid.

$^1$H NMR (CDCl$_3$): δ −0.2–0.2 (m, 138 H, Si—C$\underline{H}_3$), 0.39 (m, 20 H, C$\underline{H}_2$—$CH_2$—$CH_3$), 0.55 (m, 20 H, C$\underline{H}_2$—$CH_2$—$CH_2$—Cl), 0.85 (m, 30 H, $CH_2$—$CH_2$—C$\underline{H}_3$), 1.28 (m, 20 H, $CH_2$—C$\underline{H}_2$—$CH_3$), 1.68 (s, 20 H, $CH_2$—C$\underline{H}_2$—$CH_2$—Cl), 3.35 (s, 20 H, $CH_2$—$CH_2$—C$\underline{H}_2$—Cl), 4.58 (s, $^1$J($^1$H—$^{29}$Si)=250.1 Hz, 10 H, Si—$\underline{H}$).

Second step: 102.2 g (24.9 mmol) of the compound corresponding to formula IV with $R^1=R^2=R^3=R^4$=methyl, X=Cl, Y=$CH_2$—$CH_2$—$CH_3$, Z=$CH_2$—$CH_2$—$CH_2$, m=10, n=10, p=10 is added dropwise to a suspension of 57.1 g (327.9 mmol) Na$_2$S$_4$ in 300 ml ethanol (W=ethoxy) at room temperature over a period of 45 min. During the dropwise addition hydrogen is released and the temperature rises to 45° C. At the same time, a solid is precipitated out. On conclusion of the addition, stirring is continued for 3 h at 80° C. (refluxing). The solution is then allowed to cool and is filtered off from the NaCl formed. After the removal of the solvent by distillation, 75.0 g (65% of the theoretical value) of the compound corresponding to formula I with $R^1=R^2=R^3=R^4$=methyl, A=S$_x$, W=ethoxy, Y=$CH_2$—$CH_2$—$CH_3$, Z=$CH_2$—$CH_2$—$CH_2$, k=0, m=20, n=10, p=10 remains.

$^1$H NMR (CDCl$_3$): δ −0.2–0.2 (m, 138 H, Si—C$\underline{H}_3$), 0.42 (m, 20 H, C$\underline{H}_2$—$CH_2$—$CH_3$), 0.58 (m, 20 H, C$\underline{H}_2$—$CH_2$—$CH_2$—S), 0.88 (m, 30 H, $CH_2$—$CH_2$—C$\underline{H}_3$), 1.08 (s, 60 H, Si—O—$CH_2$—C$\underline{H}_3$), 1.30 (m, 20 H, $CH_2$—C$\underline{H}_2$—$CH_3$), 1.70 (s, 20 H, $CH_2$—C$\underline{H}_2$—$CH_2$—S), 2.5–2.9 (m, 20 H, $CH_2$—$CH_2$—C$\underline{H}_2$—S), 3.62 (s, $^3$J($^1$H—$^{29}$Si)=150.0 Hz, 40 H, Si—O—C$\underline{H}_2$—$CH_3$).

Example 2

First step: A mixture consisting of 12.9 g (169.0 mmol) allyl chloride and 220 μl of a 1% platinum solution in toluene (Karstedt catalyst) is added dropwise over a period of 30 min at 100° C. to 216.8 g (84.5 mmol) silicone oil (Baysilone oil MH 15) corresponding to formula II with $R^1=R^2=R^3=R^4$=methyl, v=40. In the course of this, the temperature rises to 130° C. On conclusion of the addition, the mixture is stirred for 1 h at 100° C. After the mixture has been cooled, 226.9 g (99% of the theoretical value) of the compound corresponding to formula IV, with $R^1=R^2=R^3=R^4$=methyl, X=Cl, Y=$CH_2$—$CH_2$—$CH_3$, Z=$CH_2$—$CH_2$—$CH_2$, m=37, n=1, p=1 is obtained as a light yellow liquid.

$^1$H NMR (CDCl$_3$): δ −0.2–0.1 (m, 138 H, Si—C$\underline{H}_3$), 0.36 (m, 2 H, C$\underline{H}_2$—$CH_2$—$CH_3$), 0.48 (m, 2 H, C$\underline{H}_2$—$CH_2$—$CH_2$—Cl), 0.76 (t, $^3$J($^1$H—$^1$H)=8.3 Hz, 3 H, $CH_2$—$CH_2$—C$\underline{H}_3$), 1.20 (m, 2 H, $CH_2$—C$\underline{H}_2$—$CH_3$), 1.62 (m, 2 H, $CH_2$—C$\underline{H}_2$—$CH_2$—Cl), 3.28 (m, 2 H, $CH_2$—$CH_2$—C$\underline{H}_2$—Cl), 4.52 (s, $^1$J($^1$H—$^{29}$Si)=250.1 Hz, 37 H, Si—$\underline{H}$).

Second step: 50.0 g (18.4 mmol) of the compound corresponding to formula IV with $R^1=R^2=R^3=R^4$=methyl, X=Cl, Y=$CH_2$—$CH_2$—$CH_3$, Z=$CH_2$—$CH_2$—$CH_2$, m=37, n=1, p=1 is added dropwise to a suspension of 3.2 g (18.4 mmol) Na$_2$S$_4$ in 160 ml ethanol (W=ethoxy) at room temperature over a period of 1 h. During the dropwise addition hydrogen is released and the temperature rises to 50° C. At the same time, a solid is precipitated out. On conclusion of the addition, stirring is continued for 4 h at 80° C. (refluxing). The solution is then allowed to cool and is filteted off from the NaCl formed. After the removal of the solvent by distillation, 70.4 g (86% of the theoretical value) of the compound corresponding to formula I with $R^1=R^2=R=R^4$=methyl, A=S$_x$, W=ethoxy, Y=$CH_2$—$CH_2$—$CH_3$, Z=$CH_2$—$CH_2$—$CH_2$, k=0, m=38, n=1, p=1 remains.

$^1$H NMR (CDCl$_3$): δ −0.2–0.2 (m, 138 H, Si—C$\underline{H}_3$), 0.44 (m, 2 H, C$\underline{H}_2$—$CH_2$—$CH_3$), 0.56 (m, 2 H, C$\underline{H}_2$—$CH_2$—$CH_2$—S), 0.82 (m, 3 H, $CH_2$—$CH_2$—C$\underline{H}_3$), 1.08 (s, 114 H, Si—O—$CH_2$—C$\underline{H}_3$), 1.28 (m, 2 H, $CH_2$—C$\underline{H}_2$—$CH_3$), 1.70 (s, 2 H, $CH_2$—C$\underline{H}_2$—$CH_2$—S), 2.5–2.9 (m, 2 H, $CH_2$—$CH_2$—C$\underline{H}_2$—S), 3.64 (m, 76 H, Si—O—C$\underline{H}_2$—$CH_3$).

Example 3

First step: A mixture consisting of 59.6 g (779.0 mmol) allyl chloride and 1 ml of a 1% platinum solution in toluene (Karstedt catalyst) is added dropwise over a period of 60 min at 110° C. to 200.0 g (77.9 mmol) silicone oil (Baysilone oil MH 15) corresponding to formula II with $R^1=R^2=R^3=R^4$=methyl, v=40. In the course of this, the temperature rises to 130° C. On conclusion of the addition, the mixture is stirred for 1 h at 110° C. After the mixture has been cooled, 257.2 g (99% of the theoretical value) of the compound corresponding to formula IV with $R^1=R^2=R^3=R^4$=methyl, X=Cl, Y=$CH_2$—$CH_2$—$CH_3$, Z=$CH_2$—$CH_2$—$CH_2$, m=25, n=5, p=5 is obtained as a light yellow liquid.

$^1$H NMR (CDCl$_3$): δ −0.2–0.2 (m, 138 H, Si—C$\underline{H}_3$), 0.34 (m, 10 H, C$\underline{H}_2$—$CH_2$—$CH_3$), 0.46 (m, 10 H, C$\underline{H}_2$—$CH_2$—$CH_2$—Cl), 0.82 (m, 15 H, $CH_2$—$CH_2$—C$\underline{H}_3$), 1.25 (m, 10 H, $CH_2$—C$\underline{H}_2$—$CH_3$), 1.68 (m, 10 H, $CH_2$—C$\underline{H}_2$—$CH_2$—Cl), 3.37 (m, 10 H, $CH_2$—$CH_2$—C$\underline{H}_2$—Cl), 4.56 (s, $^1$J($^1$H—$^{29}$Si)=249.5 Hz, 25 H, Si—$\underline{H}$)

Second step: 100.0 g (30.0 mmol) of the compound corresponding to formula IV with $R^1=R^2=R^3=R^4$=methyl, X=Cl, Y=$CH_2$—$CH_2$—$CH_3$, Z=$CH_2$—$CH_2$—$CH_2$, m=25, n=5, p=5 is added dropwise to a suspension of 26.2 g (150.0 mmol) Na$_2$S$_4$ in 300 ml ethanol (W=ethoxy) at room temperature over a period of 45 min. During the dropwise addition hydrogen is released and the temperature rises to 50° C. At the same time, a solid is precipitated out. On conclusion of the addition, stirring is continued for 6.5 h at 80° C. (refluxing). The solution is then allowed to cool and is filtered off from the NaCl formed. After the removal of the solvent by distillation, 117.7 g (87.9% of the theoretical value) of the compound corresponding to formula I with $R^1=R^2=R^3=R^4$=methyl, A=S$_x$, W=ethoxy, Y=$CH_2$—$CH_2$—$CH_3$, Z=$CH_2$—$CH_2$—$CH_2$, k=7, m=22, n=5, p=6 remains.

$^1$H NMR (CDCl$_3$): δ −0.2–0.2 (m, 138 H, Si—C$\underline{H}_3$), 0.42 (m, 10 H, C$\underline{H}_2$—$CH_2$—$CH_3$), 0.54 (m, 12 H, C$\underline{H}_2$—$CH_2$—$CH_2$—S), 0.85 (m, 15 H, $CH_2$—$CH_2$—C$\underline{H}_3$), 1.08 (s, 66 H, Si—O—$CH_2$—C$\underline{H}_3$), 1.28 (m, 10 H, $CH_2$—C$\underline{H}_2$—$CH_3$), 1.70 (s, 12 H, $CH_2$—C$\underline{H}_2$—$CH_2$—S), 2.5–2.9 (m, 12 H, $CH_2$—$CH_2$—C$\underline{H}_2$—S), 3.65 (m, 44 H, Si—O—C$\underline{H}_2$—$CH_3$), 4.60 (s, $^1$J($^1$H—$^{29}$Si)=249.6 Hz, 7 H, Si—$\underline{H}$).

Examples of Use

Preparation of the Rubber Mixtures and Vulcanizates

General Instructions for Procedure

The formulation used for the rubber mixtures is given in Table 1. There the unit phr denotes per cent by weight, based on 100 parts of the crude rubber used.

TABLE 1

| Substance | Quantity [phr] |
| --- | --- |
| First step | |
| Buna VSL 5025-1 | 96.0 |
| Buna CB 24 | 30.0 |
| Ultrasil 7000 | 80.0 |
| ZnO | 3.0 |
| Stearic acid | 2.0 |
| Naftolene ZD | 10.0 |
| Vulkanox 4020 | 1.5 |
| Protector G35P | 1.0 |
| Silane | 6.4 |
| coupling agent | (in Ex. 4,7) |
| funct. silicone | 6.4 |
| oil as in Ex. 2 | (in Ex. 5,6) |
| and 3 | |
| Second step | |
| Batch from Step 1 | |
| Third step | |
| Batch from Step 2 | |
| Vulkacit D | 2.0 |
| Vulkacit CZ | 1.5 |
| Sulfur | 2.1 |

The polymer VSL 5025-1 is an SBR copolymer which is polymerisable in solution, a product of Bayer AG, having a styrene content of 25 wt. % and a butadiene content of 75 wt. %. Of the butadiene, 73% is 1,2 bonded, 10% is cis 1,4 bonded and 17% is trans 1,4 bonded. The copolymer contains 37.5 phr oil and has a Mooney viscosity (ML 1+4/100° C.) of 50±4.

The polymer Buna CB 24 is a cis 1,4 polybutadiene (Neodymium type), a product of Bayer AG, having cis 1,4-content of 97%, a trans 1,4-content of 2%, a 1,2-content of 1% and a Mooney viscosity of 44±5.

The HD silica Ultrasil 7000, a product of Degussa AG, has a BET surface area of 180 m$^2$.

The silane bis(3-[triethoxysilyl]propyl)disulfane (TESPD) is a silane having a disulfane content of >80% and a polysulfane content S(x>4) of <4%. This substance can be obtained by a process according to Patent D 195 41 404. The silane propyltriethoxysilane (PTES) is an alkylsilane which is sold by Degussa AG under the trade name Si 203.

Naftolene ZD, a product of Chemetall, is used as an aromatic oil. Vulkanox 4020 is a 6PPD from Bayer AG and Protektor G35P is an antiozonant wax from HB-Fuller GmbH. Vulkacit D (DPG) and Vulkacit CZ (CBS) are commercial products of Bayer AG.

The rubber mixture is prepared in three steps in a closed mixer, in accordance with the following tabulated schedule.

TABLE 2

| Step 1 | |
| --- | --- |
| Settings | |
| Mixing unit | Werner & Pfleiderer E Type |
| Friction | 1:1.11 |
| Rotational speed | 70 min-1 |
| Plunger pressure | 5.5 bar |
| Empty volume | 1.6 l |
| Filling ratio | 0.55 |
| Flow temp. | 80° C. |
| Mixing process | |
| 0 to 1 min | Buna VSL 5025-1 + Buna CB 24 |
| 1 to 3 min | ½ Ultrasil VN3, ZnO, stearic acid, Naftolen ZD, silane, optionally nucleophilic |
| 3 to 4 min | ½ Ultrasil VN3, Vulkanox 4020, Protector G35P |
| 4 min | clean |
| 4 to 5 min | mix |
| 5 min | clean |
| 5 to 6 min | mix and discharge |
| Batch temp. | 140–150° C. |
| Storage | 24 h at room temperature |
| Step 2 | |
| Settings | |
| Mixing unit | as in Step 1, except for: |
| Rotational speed | 80 min-1 |
| Filling ratio | 0.53 |
| Flow temp. | 80° C. |
| Mixing process | |
| 0 to 2 min | Break up batch from Step 1 |
| 2 to 5 min | Batch temperature 150° C., maintain by varying number of revolutions |
| 5 min | discharge |
| Batch temp. | 150–155° C. |
| Storage | 4 h at room temperature |
| Step 3 | |
| Settings | |
| Mixing unit | as in Step 1, except for: |
| Rotational speed | 40 min-1 |
| Filling ratio | 0.51 |
| Flow temp. | 50° C. |
| Mixing process | |
| 0 to 2 min | Batch from Step 2 + Vulkacit CZ + Vulkacit D + sulfur |
| 2 min | discharge and produce sheet on laboratory mixing roll (diameter 200 mm, length 450 mm, flow temperature 50° C.) Homogenization: 3* left, 3* right cut and turn over and then pass through 8* at narrow roll nip (1 mm) and 3* at wide roll nip (3.5 mm) and then draw out a sheet |
| Batch temp. | 85–95° C. |

The general process for preparing rubber mixtures and their vulcanizates is described in "Rubber Technology Handbook", W. Hofmann, Hanser Verlag, 1994.

The vulcanization temperature is 165° C.

The testing of the rubber is carried out in accordance with the methods of test shown in Table 3.

TABLE 3

| Physical testing | Standard/conditions |
| --- | --- |
| ML 1 + 4, 100° C. | DIN 53523/3, ISO 667 |
| Vulcanization test, 165° C. | DIN 53529/3, ISO 6502 |

TABLE 3-continued

| Physical testing | Standard/conditions |
|---|---|
| Tensile test on a ring, 23° C. | DIN 53504, ISO 37 |
| Tensile strength | |
| Yield strengths | |
| Stretch at break | |
| Shore A hardness, 23° C. | DIN 53 505 |
| Viscoelastic properties, | DIN 53 513, ISO 2856 |
| 0 and 60° C., 16 Hz, 50N mean | |
| force amplitude and 25N | |
| amplitude force | |
| Complex E* modulus | |
| Loss factor tan δ | |
| Dispersion | ISO/DIS 11345 |

Examples 4 to 7

Examples 4 to 7 are carried out in accordance with the general instructions given above; the mixture 4 (silane coupling agent PTES) and the mixture 7 (silane coupling agent TESPD) are reference examples from prior art.

In a variation from the Reference Examples 4 and 7, the sulfur-functionalized silicone oil as in Example 2 is introduced into the mixture from Example 5 and the silicone oil as in Example 3 is mixed into Example 6.

The data obtained from the rubber tests on the crude mixture and the vulcanizate are as listed in Table 4.

TABLE 4

| Characteristic: | Unit | 4 | 5 | 6 | 7 |
|---|---|---|---|---|---|
| Results for the crude mixture | | | | | |
| ML(1 + 4) at 100° C. (third Step) | [MU] | 59 | 56 | 56 | 55 |
| Vulcanization test 165° C. | | | | | |
| Dmax-Dmin | [dNm] | 12.6 | 16.3 | 17.6 | 16.7 |
| t 10% | [min] | 4.9 | 4.7 | 2.3 | 2.6 |
| t 90% | [min] | 11.1 | 10.0 | 8.5 | 20.7 |
| t 90%[–t10% | [min] | 6.2 | 5.3 | 6.2 | 18.1 |
| Reaction constants k(V) | [1/min] | 0.84 | 1.17 | 0.92 | 0.55 |
| Vulcanization time | [min] | 50 | 25 | 25 | 60 |
| Results for the vulcanizate | | | | | |
| Tensile test | | | | | |
| Tensile strength | [MPa] | 10.7 | 11.7 | 13.8 | 14.4 |
| Yield strength 100% | [MPa] | 0.6 | 1.3 | 1.7 | 2.0 |
| Yield strength 300% | [MPa] | 2.6 | 5.3 | 8.5 | 10.7 |
| Stretch at break | [%] | 710 | 510 | 420 | 360 |
| Energy at break | [J] | 90.7 | 79.8 | 77.3 | 66.2 |
| Shore A hardness | [SH] | 55 | 61 | 63 | 63 |
| Viscoelastic properties | | | | | |
| Complex E* modulus (0° C.) | [MPa] | 20.3 | 20.3 | 17.6 | 19.6 |
| Complex E* modulus (6020 C.) | [MPa] | 6.3 | 6.5 | 6.8 | 7.5 |
| Loss factor tan δ(0° C.) | [-] | 0.493 | 0.504 | 0.485 | 0.431 |
| Loss factor tan δ(60° C.) | [-] | 0.175 | 0.153 | 0.124 | 0.124 |
| Dispersion | [-] | 9 | 7 | 7 | 7 |

From the low Mooney viscosities of mixtures 5 and 6 in Table 4, it is clear that the claimed silicone oils are just as able to render the silica water repellent as are the silanes in the reference mixtures 4 and 7 from prior art. It can also be seen that, with increasing amounts of sulfur functionality in the silicone oils, the Shore A hardness and the yield strengths are definitely increased compared with those in Reference Example 4, and in Example 6 the level of Example 7 is almost achieved. Moreover, conspicuous in the functionalized silicone oil in Example 6 is an advantageously high tan δ (0° C.) value, which correlates with an improved wet skid resistance; without loss in the tan δ (60° C.) value, which is associated with the rolling resistance.

Compared with the Reference Example 7, the rapid vulcanization kinetics in the functionalized silicone oils are especially advantageous. Here one may mention in particular the short t90%–t10% times and the higher reaction constants k(V) (first order reaction).

Further variations and modifications of the invention will be apparent to those skilled in the art from the foregoing and are intended to be encompassed by the claims appended hereto.

German priority application nos. 199 05820.2 and 198 49 404.1 are relied on and incorporated herein by reference.

We claim:

1. A sulfur-functional polyorganosiloxane corresponding to the general formula I

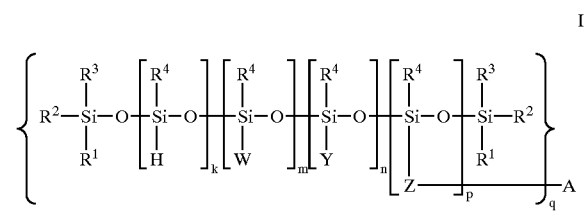

I wherein $R^1$, $R^2$, $R^3$, $R^4$, independently of one another, denote H,($C_1$–$C_4$)alkyl, ($C_1$–$C_4$)alkoxy, ($C_1$–$C_4$)haloalkoxy, ($C_1$–$C_4$)haloalkyl, aryl or aralkyl and W denotes a group which bonds to the silica and Y denotes alkyl, haloalkyl, aryl or aralkyl and Z is optionally present and denotes an alkylidene group having 1–6 carbon atoms and A denotes a group which bonds with at least one elastomer of the rubber mixture:

for q=1 a mercapto group(SH) and thiocyanate group (SCN) and for q=2 a disulfide ($S_2$) and a polysulfide ($S_x$) with x=2–10 and H denotes hydrogen and the sum of k+m+n+p≧3 and k and n can equal 0.

2. A sulfur-functional polyorganosiloxane corresponding to the general formula I

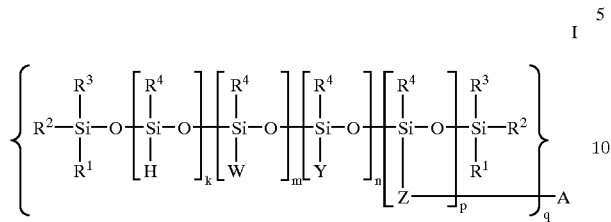

wherein $R^1$, $R^2$, $R^3$, $R^4$, independently of one another, denote H, $(C_1-C_4)$ alkyl, $(C_1-C_4)$ alkoxy, $(C_1-C_4)$ haloalkoxy, $(C_1-C_4)$ haloalkyl, aryl or aralkyl and W denotes a group which bonds to the silica and Y denotes alkyl, haloalkyl, aryl or aralkyl and Z denotes $CH_2CH_2CH_2$, and A denotes a group which bonds with at least one elastomer of the rubber mixture:
  for q=1 a mercapto group(SH) and thiocyanate group (SCN) and
  for q=2 a disulfide ($S_2$) and a polysulfide ($S_x$) with x=2–10 and
  H denotes hydrogen and the sum of k+m+n+p≧3 and k and n can equal 0.

3. The sulfur-functional polyorganosiloxane according to claim 1, wherein the aryl is a phenyl.

4. The sulfur-functional polyorganosiloxane according to claim 1, wherein the W is further limited to a $(C_1-C_6)$ alkoxy or $(C_1-C_4)$ haloalkoxy.

* * * * *